United States Patent Office 3,819,731
Patented June 25, 1974

3,819,731
PRODUCTION OF CHLORINATED UNSATURATED HYDROCARBONS
Harold M. Pitt, Lafayette, and Harry Bender, El Cerrito, Calif., assignors to Stauffer Chemical Company
No Drawing. Continuation-in-part of abandoned application Ser. No. 16,946, Mar. 23, 1960. This application Feb. 16, 1961, Ser. No. 89,640
Int. Cl. C07c 21/00, 21/02, 21/14
U.S. Cl. 260—654 R
12 Claims

ABSTRACT OF THE DISCLOSURE

This invention relates to the production of partially chlorinated hydrocarbons by reacting perchloroethylene or trichloroethylene, in the vapor phase, with methyl chloride, ethane, propylene, toluene or p-xylene.

This application is a continuation-in-part of application Ser. No. 16,946 filed Mar. 23, 1960 and now abandoned.

This invention relates to the production of certain partially chlorinated hydrocarbons wherein one terminal carbon atom of each of the two reactants forms a carbon-carbon bond to produce a partially chlorinated unsaturated hydrocarbon having a carbon chain length equal to the sum of the carbon chain lengths of the two reacting compounds.

In general, the process of this invention comprises feeding perchloroethylene or trichloroethylene in the presence of methyl chloride, ethane, propylene, toluene or p-xylene into a heated reaction zone to yield one of several products. The process is carried out at a temperature of between about 500° C. and 750° C. and preferably from 550° C. to 710° C. Retention times in the heated reaction zone of between about 0.1 and 10 second may be used and preferably between 1 and 4 seconds.

No catalyst is used. The reaction is ordinarily conducted at about atmospheric pressure although higher or lower pressures may be used. The reaction may be conducted in a Vycor, quartz or carbon tube or in a stainless steel or Monel reaction vessel. In any event, the reactor should be unpacked and have a minimum wall surface. The usual pumice, carbon, and broken porcelain packing materials cause unsatisfactory results.

The mechanism thought to result in the formation of the reaction products is set forth in the equation below; trichloroethylene and methyl chloride are represented, but corresponding sets of equation are applicable for the other reactants.

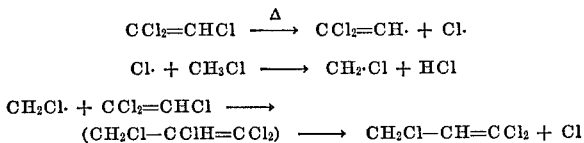

Examples have been set forth below for illustrative purposes and these are not to be interpreted as imposing limitations on the scope of the invention other than as set forth in the appended claims.

EXAMPLE I

Perchloroethylene vapor (.0135 mols/min.) and methyl chloride (.01835 mols/min.) were mixed and passed through a 60 cc. Vycor reactor held at 580–590° C. The condensed perchloroethylene contained 12 mols percent of 1,1,2,3-tetrachloropropene-1. This material boiled at 167° C. uncorrected, had a specific gravity of 1.5347 30°/4 and checked the IR spectra published in JACS 74, 3329. The yield from the reacted material was about 95%.

EXAMPLE II

Trichloroethylene vapor (.0142 mols/min.) and methyl chloride (.01835 mols/min.) were mixed and passed through a 60 cc. Vycor tubular reactor at a temperature of 630° C. The condensed trichloroethylene contained 16 mol percent of 1,1,3-trichloropropene-1. The yield from the reacted material was about 85%. The recovered 1,1,3-trichloropropene-1 boiled uncorrected at 135–135½° C. The retention time was about 4 seconds.

EXAMPLE III

Perchloroethylene vapor (.0135 mols/min.) and ethane (.02 mols/min.) were mixed and passed through a Vycor tube held at 610° C. The condensed perchloroethylene contained 14 mol percent of 1,1,2-trichlorobutene-1, boiling point 140° C. uncorrected. Identified by I.R. The yield from the reacted material was over 90%.

EXAMPLE IV

Trichloroethylene vapor (.0142 mols/min.) and ethane (.02 mols/min.) were mixed and passed through a Vycor tube held at 600° C. The condensed trichloroethylene contained 15 mol percent of 1,1-dichlorobutene-1, boiling point 103.8–104° C. Identified by I.R. The yield of material was about 85% based on reacted material as determined by gas chromatography.

EXAMPLE V

Perchloroethylene vapor (.0135 mols/min.) and toluene vapor (.0135 mols/min.) were mixed and passed through the 60 cc. Vycor reactor at 710° C. The condensed material contained 15 mol percent 1-phenyl-2,3,3-trichloropropene-3. Yield based on reacted material was about 80% as determined by gas chromatography. Identified by I.R., chlorine analysis, and a molecular weight determination.

EXAMPLE VI p-Xylene and perchloroethylene were mixed in the molar ratio 1:2. This was then vaporized and passed through a 60 cc. Vycor reactor at a feed rate of 6 cc. of liquid/min. The temperature of the reactor was 670° C. The condensed product contained 7.5 mol percent of 1-(4 - methylphenyl)-2,3,3-trichloropropene-3 easily separated by distillation, boiling at 158–160° C. at 10–12 mms., $N_d^{30}$ 1.5555. At this conversion yields were of the order 85–90%. It may be calculated from the flow rates and reactor volumes listed in the foregoing examples that retention times of between 3 and 5 seconds were used.

EXAMPLE VII

Perchloroethylene vapor (.128 mols/min.) and propylene (.0835 mols/min.) were mixed and passed through the 60 cc. Vycor reactor held at 680° C. The condensed liquid contained 9 mol percent 1,1,2-trichloropentadiene, boiling point 51° C. at 15 mms., identified by chlorine analysis and I.R. Yield was approximately 80% based on material reacted.

EXAMPLE VIII

Trichloroethylene vapor (.128 mols/min.) and propylene (.0835 mols/min.) were mixed and passed through the Vycor reactor at about 650° C. to produce 1,1-dichloropentadiene-1,4 in approximately 80% yield based on reacted material. This compound boiled at 36° C. at 20 mm. pressure. This was found to be a new compound identified by I.R. and chlorine analysis.

Most of the compounds of this invention are well known, and the utilities therefor are also well understood. With respect to the compounds of Examples VI, VII and VIII, however, these are new compositions of matter and may be polymerized and used as caulking compounds, adhesives or potting resins. The polymers may be formed through free radical initiated polymerization procedures and more particularly by contacting the compound to be polymerized with about 2% of a catalyst, diisopropylperoxydicarbonate, and adjusting the temperature of the monomer-catalyst mixture to between about 25° and 80° C. while holding such mixture under an argon atmosphere in a sealed tube for a period of as long as one week. The seal is then broken and the unreacted monomer removed by heating the contents of the tube in an oven for periods of about 72 hours at 80° C. This procedure, utilizing a reaction temperature of about 25° C., resulted in an 11.4% yield of a polymer having the utilities mentioned when carried out using the 1,1,2-trichloropentadiene of Example VII. When carried out utilizing the compounds of Examples VI and VIII, yields of polymers in the neighborhood of 2% are obtained. Virtually no yields of polymer are obtained when similar procedures are applied to the compounds of Examples I–V.

Obviously, many modifications and variations may be made without departing from the spirit and scope of the invention, and therefore only such limitations should be imposed as are indicated in the appended claims.

We claim:

1. A vapor phase process comprising reacting in the absence of a catalyst a compound selected from the class consisting of trichloroethylene and perchloroethylene with a compound selected from the class consisting of methyl chloride, ethane, propylene, toluene and p-xylene at a temperature of between about 500° and 750° C. for a period of between about 0.1 and 10 seconds to produce a partially chlorinated unsaturated hydrocarbon having a carbon chain length equal to the sum of the carbon chain lengths of the two reacting compounds.

2. A vapor phase process comprising reacting in the absence of a catalyst perchloroethylene and methyl chloride at a temperature of between about 500° and 750° C. for a period of between about 0.1 and 10 seconds to yield 1,1,2,3-tetrachloropropene-1.

3. A vapor phase process comprising reacting in the absence of a catalyst trichloroethylene and methyl chloride at a temperature of between about 500° and 750° C. for a period of between about 0.1 and 10 seconds to yield 1,1,3-trichloropropene-1.

4. A vapor phase process comprising reacting in the absence of a catalyst perchloroethylene and ethane at a temperature of between about 500° and 750° C. for a period of between about 0.1 and 10 seconds to yield 1,1,2-trichlorobutene-1.

5. A vapor phase process comprising reacting in the absence of a catalyst trichloroethylene and ethane at a temperature of between about 500° and 750° C. for a period of between about 0.1 and 10 seconds to yield 1,1-dichlorobutene-1.

6. A vapor phase process comprising reacting in the absence of a catalyst perchloroethylene and toluene at a temperature of between about 500° and 750° C. for a period of between about 0.1 and 10 seconds to yield 1-phenyl-2,3,3-trichloropropene-3.

7. A vapor phase process comprising reacting in the absence of a catalyst perchloroethylene and p-xylene at a temperature of between about 500° and 750° C. for a period of between about 0.1 and 10 seconds to yield 1-(4-methylphenyl)-2,3,3-trichloropropene-3.

8. A vapor phase process comprising reacting in the absence of a catalyst perchloroethylene and propylene at a temperature of between about 500° and 750° C. for a period of between about 0.1 and 10 seconds to yield 1,1,2-trichloropentadiene.

9. A vapor phase process comprising reacting in the absence of a catalyst trichloroethylene and propylene at a temperature of between about 500° and 750° C. for a period of between about 0.1 and 10 seconds to yield 1,1-dichloropentadiene-1,4.

10. A vapor phase process comprising reacting in the absence of a catalyst a compound selected from the class consisting of perchloroethylene and trichloroethylene with a compound selected from the class consisting of methyl chloride, propylene, ethane, p-xylene and toluene for a period of between about 1 and 4 seconds at a temperature of between about 550° and 710° C. to produce a partially chlorinated unsaturated hydrocarbon having a carbon chain length equal to the sum of the carbon chain lengths of the two reacting compounds.

11. A vapor phase process comprising reacting perchloroethylene and methyl chloride at a temperature between 500° and 700° C. for a period between 1 and 10 seconds to yield 1,1,2,3-tetrachloropropene-1.

12. As a composition of matter, the compound 1,1,2-trichloropentadiene.

References Cited

Petrov et al.: Doklady Adad. Nauk U.S.S.R., vol. 131, pp. 1098–1101 (1960).

HOWARD T. MARS, Primary Examiner

U.S. Cl. X.R.

210—91.7, 651 R